United States Patent
Kaburlasos et al.

(10) Patent No.: US 9,253,524 B2
(45) Date of Patent: Feb. 2, 2016

(54) SELECTIVE POST-PROCESSING OF DECODED VIDEO FRAMES BASED ON FOCUS POINT DETERMINATION

(75) Inventors: Nikos Kaburlasos, Lincoln, CA (US);
Scott W. Cheng, Folsom, CA (US);
Scott Janus, Rocklin, CA (US); Michael A. Smith, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 609 days.

(21) Appl. No.: 13/554,269

(22) Filed: Jul. 20, 2012

(65) Prior Publication Data

US 2014/0023351 A1 Jan. 23, 2014

(51) Int. Cl.
*H04N 5/93* (2006.01)
*H04N 21/4223* (2011.01)
*H04N 21/4728* (2011.01)

(52) U.S. Cl.
CPC ....... *H04N 21/4223* (2013.01); *H04N 21/4728* (2013.01)

(58) Field of Classification Search
CPC ....................................................... H04N 5/93
USPC ............................................ 386/353, E5.028
See application file for complete search history.

(56) References Cited

U.S. PATENT DOCUMENTS

| 8,913,004 | B1* | 12/2014 | Bozarth et al. | 345/156 |
| 2012/0300061 | A1* | 11/2012 | Osman et al. | 348/135 |
| 2012/0319928 | A1* | 12/2012 | Rhodes | 345/8 |

* cited by examiner

*Primary Examiner* — Thai Tran
*Assistant Examiner* — Nien-Ru Yang
(74) *Attorney, Agent, or Firm* — Douglas J. Ryder; Ryder, Lu, Mazzeo & Konieczny LLC (57) ABSTRACT

In general, in one aspect, a graphics driver receives information related to where eyes of a user watching a video are focused, determine if the user is focusing their attention on a particular location of the video, and generates post processing instructions for pixel macro blocks of decoded video frames. The instructions are based on whether it is determined that the user is focused. The graphics driver is further to determine a focus area associated with the particular location the user is focusing their attention on, determine a peripheral area around the focus area, generate a first set of post processing instructions for pixel macro blocks within the focus area, generate a second set of post processing instructions for pixel macro blocks within the peripheral area, and generate a third set of post processing instructions for pixel macro blocks not within either area.

21 Claims, 8 Drawing Sheets

SELECTIVE POST-PROCESSING OF DECODED VIDEO FRAMES BASED ON FOCUS POINT DETERMINATION

BACKGROUND

Video playback typically includes decoding of a video stream and then performing different types of post processing on the decoded frames. Image post processing is intended to enhance the perceived visual quality of the pixels in an image (video frame). Examples of such post processing include, but are not limited to denoise (application of filters to remove noise from image), contrast enhancement (modification of pixel luminosity, 'Y' component of the 'YUV' representation of a pixel, to enhance contrast based on image characteristics), skin tone enhancement (enhancement of hue and saturation of pixels which represent skin-like colors) and color control (modification of the U and V component of a 'YUV' pixel to adjust saturation of colors).

Image post processing is performed on all pixels (macro blocks of pixels) for each decoded frame during video playback. The post processing may be performed, for example, on a host CPU, a programmable GPU, or on fixed function logic. No matter where it is performed, it will require the use of processing resources and will require that some power be dissipated on the platform.

BRIEF DESCRIPTION OF THE DRAWINGS

The features and advantages of the various embodiments will become apparent from the following detailed description in which.

DETAILED DESCRIPTION

When a user is viewing a video there may be times when their attention is focused on a specific portion of the display. During these times, it is more likely that the user will notice the quality of the image at this focal point and less likely that they will notice the image quality further away from the focal point. Accordingly, power and processing resources could be conserved if image post processing (enhanced image quality) was concentrated on the area the user is focused on.

Consumer electronics devices (e.g., computers, televisions, tablets) may come equipped with one or more cameras. The cameras within the devices may monitor the user and may capture, for example, user gestures, body posture, facial features, eye tracking, gazing direction and the like. Certain programs and/or applications running on the device may be capable of performing analytics on the captured images and be capable of determining what the user is doing and take actions based thereon (provide at least some level of user interface for the program/application).

In the future, the use of cameras to capture actions of the user of the device and analytics to determine what the user is doing and take actions based thereon may become part of the baseline functionality of devices. These devices will be optimized to capture and process the images very efficiently. The functionally may be continuously active in the background of the device. The device may utilize the user actions to control the device without the need for the user to touch the device or a physical user interface device (e.g., mouse, remote control). That is, the user's actions become an intuitive user interface for the device. The user's actions may include, for example, the movement of the users hand, change in body posture, or movement of their eyes. Based on the users actions, the device may, for example, launch an application, modify a document, turn on (or off) capabilities, and zoom in (or out).

The images captured by the cameras and the eye/gaze-tracking functionality performed may be utilized to determine when a user is focusing their attention on a portion of the video and to where that portion is. The determination may be based on, for example, the user's eyes having been focused on a specific area for longer than a predetermined amount of time. If the user is continually scanning different parts of the video a focus area may not be defined. Based on a determination of a focus area, the image post processing may be concentrated thereon. The image post processing performed outside of the focus area may be decreased and/or eliminated with a resulting decrease in the image quality (not likely to be detected) to save power and processing resources. Alternatively, the post processing performed within the focus area may be increased to enhance the image quality therewithin without drastically increasing the power and processing resources. Some combination thereof may be utilized to enhance the image quality around the focal point without increasing, and possibly decreasing the power and processing resources. For ease of discussion we will focus on decreasing/eliminating post processing outside of the focus area. However, the disclosure is in no way intended to be limited thereby.

Figure 1:
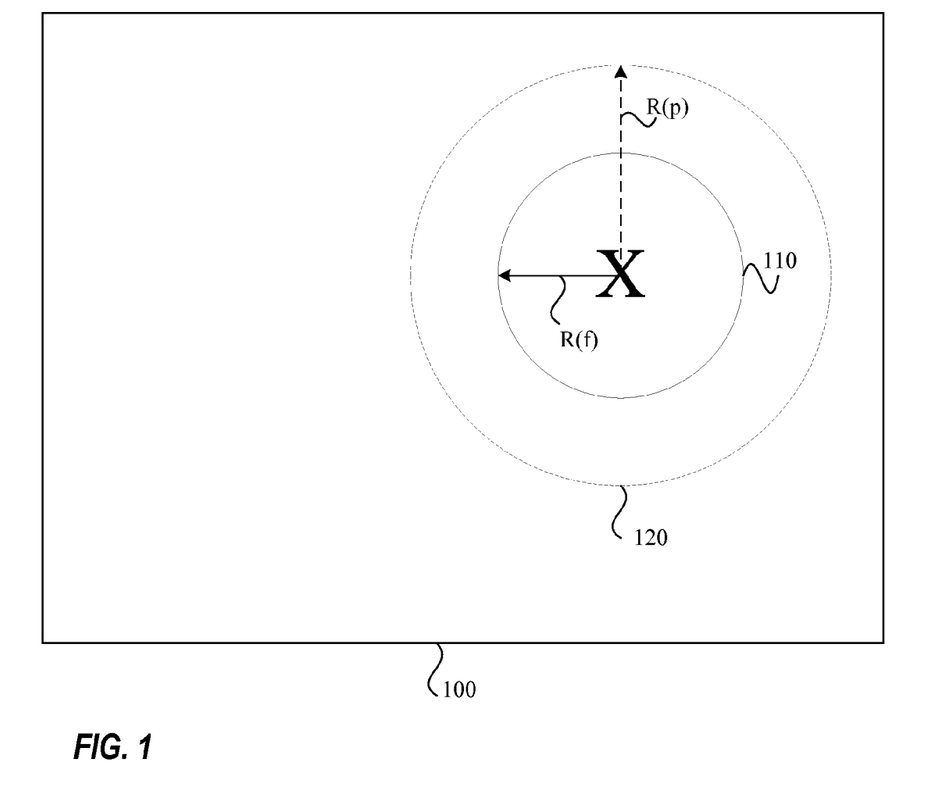
FIG. 1 illustrates an example identification of a focus area on a video frame, according to one embodiment.

FIG. 1 illustrates an example video frame 100 having a focus point determination identified by an X. The quality of the video is most noticeable at the focus point X. That is, the enhanced quality of the pixels subsequent to image post processing is most noticeable at the focus point X and in close proximity thereto (focus area 110) and becomes less noticeable as you extend therefrom. The focus area 110 may be defined as all pixels whose distance from the focus point X is less than a first distance R(f) therefrom. That is, the focus area 110 may be defined as a circle having a midpoint at X and a radius R(f). The user's peripheral vision may notice the quality of pixels outside the focus area 110 to a lesser degree (peripheral area 120). The peripheral area 120 may be defined as all pixels whose distance from the focus point X is greater than R(f) but less than a second distance R(p) therefrom. That is, the peripheral area 120 may be defined as portion of a circle having a midpoint at X and a radius R(p) that extends outside the focus area 110. The quality of pixels that are 'too far' from the focus point (e.g., outside the peripheral area 120) may not be noticed by the user.

According to one embodiment, the pixels within the focus area 110 may have the defined image post processing performed thereon. The defined post processing may vary based on the video being presented and/or other parameters. If the post processing was limited to the focus area 110 a discontinuity may be perceived at the boundary thereof. Accordingly, the image post processing may also be performed to a lesser degree in the peripheral area 120. The peripheral area 120 may act as a transition area where the amount of post processing is reduced as you proceed from R(f) to R(p). No post processing may be performed outside of the peripheral area 120.

The R(f) and R(p) values may be static or dynamic. The R(f) and R(p) values may be configurable (programmable) either by a user or by the device based on the video being presented or other parameters. According to one embodiment, the R(f) and R(p) values may vary based on the number of users viewing the video and/or the perceived identity of the user(s) viewing the video.

The image post processing is likely performed on macro blocks of pixels at a time. Once, a determination is made that the user is focused on an area of the video, the focus area 110 and the peripheral area 120 may be determined. A determination may then be made as to what macro blocks fall within each area.

Figure 2:
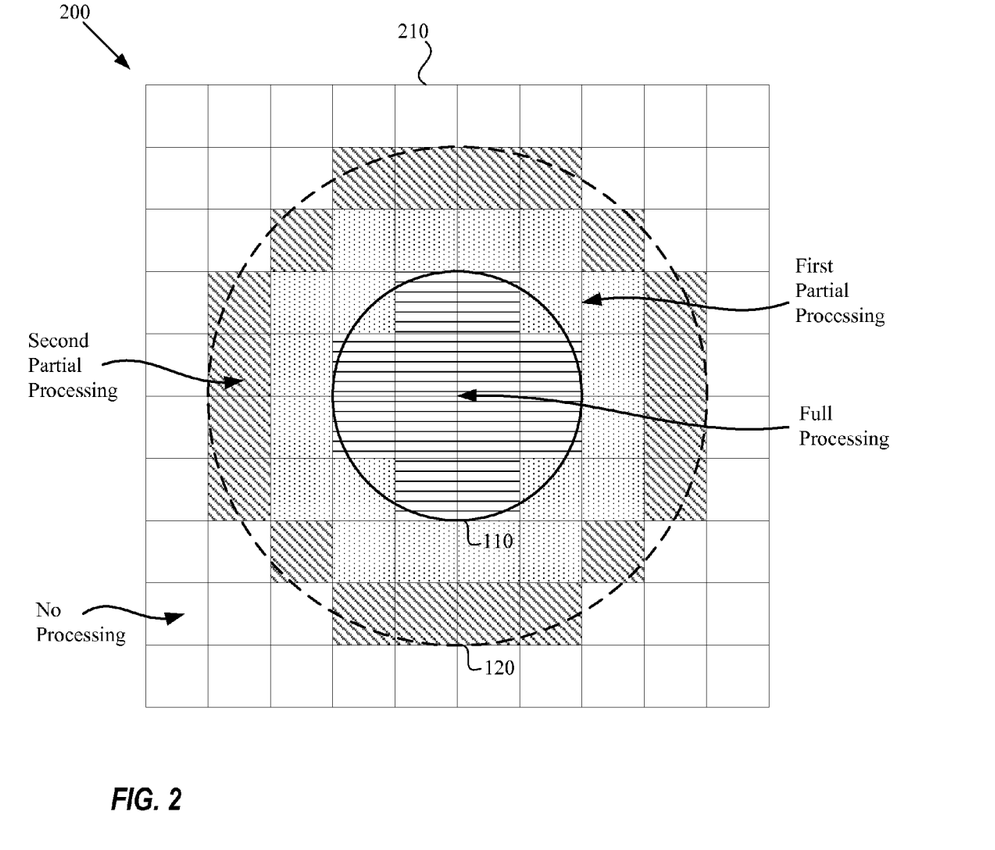
FIG. 2 illustrates an example identification of post processing levels for different macro blocks of pixels of a video frame, according to one embodiment.

FIG. 2 illustrates an example video frame 200 having a plurality of macro blocks 210 and the focus area 110 and the peripheral area 120 overlaid thereon. The macro blocks 210 substantially within the focus area 110 (those illustrated with horizontal stripes) may have the full scope of post processing performed thereon so that the pixel quality is high. The macro blocks outside of the peripheral area 120 (those illustrated as clear) may have no post processing performed. The macro blocks within the peripheral area 120 may have partial post processing performed. The post processing performed may be dependent of the proximity to the focus area 110 (less processing as you get further from the focus area 110). Two partial levels of post processing are illustrated. By way of example, the first level of post processing may be ⅔ of the full processing and the second level may be ⅓.

By way of example, assume the defined post processing is to increase the luminosity (Y) of the decoded pixels by a factor of "k". The defined post processing may be performed on the macro blocks within the focus area 110, such that Y(new)=k*Y(decode). The post processing for macro blocks within the peripheral area 120 may be scaled, such that Y(new)=k*scaling factor*Y(decode), where 1>scaling factor>0. The scaling factor may be based on the distance R the pixels (or macro blocks) are from focus area 110, where R(p)>R>R(f). For example, the scaling factor may a percentage of the peripheral area 120 that the pixels are away from the focus area 110 (R(p)−R)/(R(p)−R(f)). The macro blocks outside the peripheral area 120 may not be post processed.

The example reduction in image post processing was related to reducing the post processing factor associated with a single type of post processing (luminosity). The disclosure is in no way intended to be limited thereto. Rather, the reduction may be applied to the factors associated with more than one type of, and possibly all, post processing functions defined to be performed. Furthermore, the reduction may be in the number of post processing functions performed (e.g., 3 functions for macro blocks within focus area, 2 or 1 functions for macro blocks within the peripheral area, and no functions for macro blocks external to both).

Figure 3:
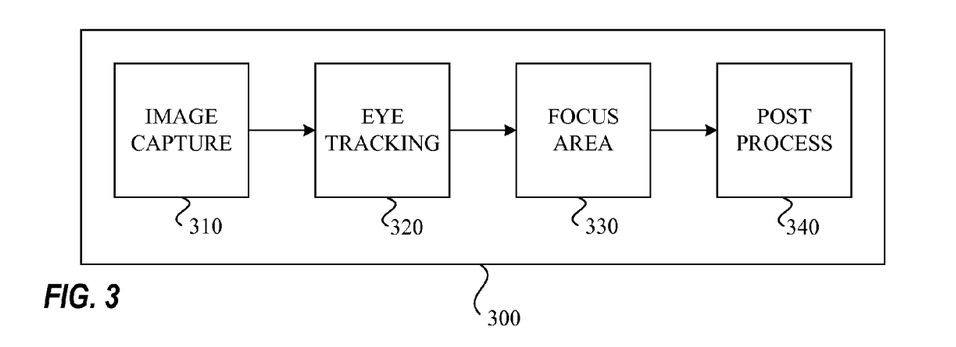
FIG. 3 illustrates an example functional block diagram of a system utilizing selective image post processing, according to one embodiment.

FIG. 3 illustrates an example functional block diagram of a system utilizing selective image post processing 300. The system 300 includes image capture functionality (e.g., one or more cameras) 310, eye/gaze-tracking functionality 320, focus area determination functionality 330 and image post processing functionality 340. The image capture functionality 310 captures images of the user as they interact with the device and the eye/gaze tracking functionality 320 analyses the images to determine where the user's eyes are focused. Coordinates associated with where the user's eyes are focused are provided to the focus area determination functionality 330 which determines if the user's eyes are focused on the same portion of the video (same general area) for at least a predefined amount of time. The amount may be configurable either by the user or by the system, for example, based on the video being presented. The focus area determination functionality 330 may provide the post processing functionality 340 with information related to any detected focus areas. The post processing functionality 340 performs the post processing on the image. The post processing may be the standard post processing performed on each pixel of the image if no focus area is detected or may be selective post processing if a focus area is detected. The selected post processing may include defined post processing in the focus area, partial post processing in a peripheral area and no post processing outside the peripheral area.

The post processing functionality 340 may include a plurality of processing engines that operate in parallel to each other. Each engine may be capable of performing processing on one macro block at a time. The macro blocks for an image may be maintained in a queue and when a processing engine completes processing on a macro block it may select the next one from the queue. As the amount of processing required on each macro block may be different, the amount of macro blocks processed by each engine may vary. When a new frame is ready for processing the macro blocks associated therewith may be stored in the queue.

Figure 4:
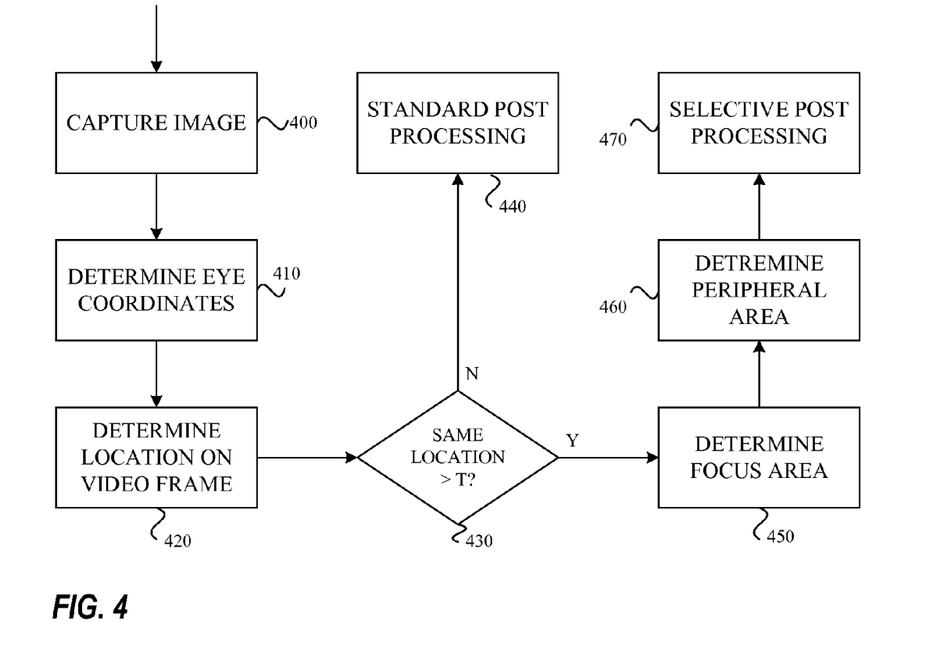
FIG. 4 illustrates an example flow chart for determining the type of post processing to be performed, according to one embodiment.

FIG. 4 illustrates an example flow chart for determining the type of post processing to be performed. An image of the user is captured 400 and a determination is made as to the coordinates associated with the user's eyes 410. Based on the coordinates of the user's eyes a location on the image (video frame) is determined 420. A determination is made as to whether the user's eyes have been focused on the same general location of the image for more than a defined time T 430. If the user's eyes have not been focused on the same location for longer than T (430 No), then standard post processing is performed 440. Standard post processing is where all macro blocks of pixels in the image are processed the same. If the user's eyes have been focused on the same location for T (430 Yes), then the focus area is determined 450. The focus area may be defined as the area of the image within a certain distance from the point where the user's eyes are focused (e.g., R(f) from the focus point X as illustrated in FIG. 1).

A determination of the peripheral area is then made 460. The peripheral area may be defined as the area of the image surrounding the focus area (e.g., R(p) from the focus point X as illustrated in FIG. 1). Based on the focus area and the peripheral area selective post processing is performed on the image 470. The selective post processing may include different levels of post processing for the different areas of the image (focus area, peripheral area, and areas outside the peripheral area). For example, the selective post processing may include full post processing in the focus area, transitional post processing in the peripheral area, and no post processing in areas outside the peripheral area.

Figure 5:
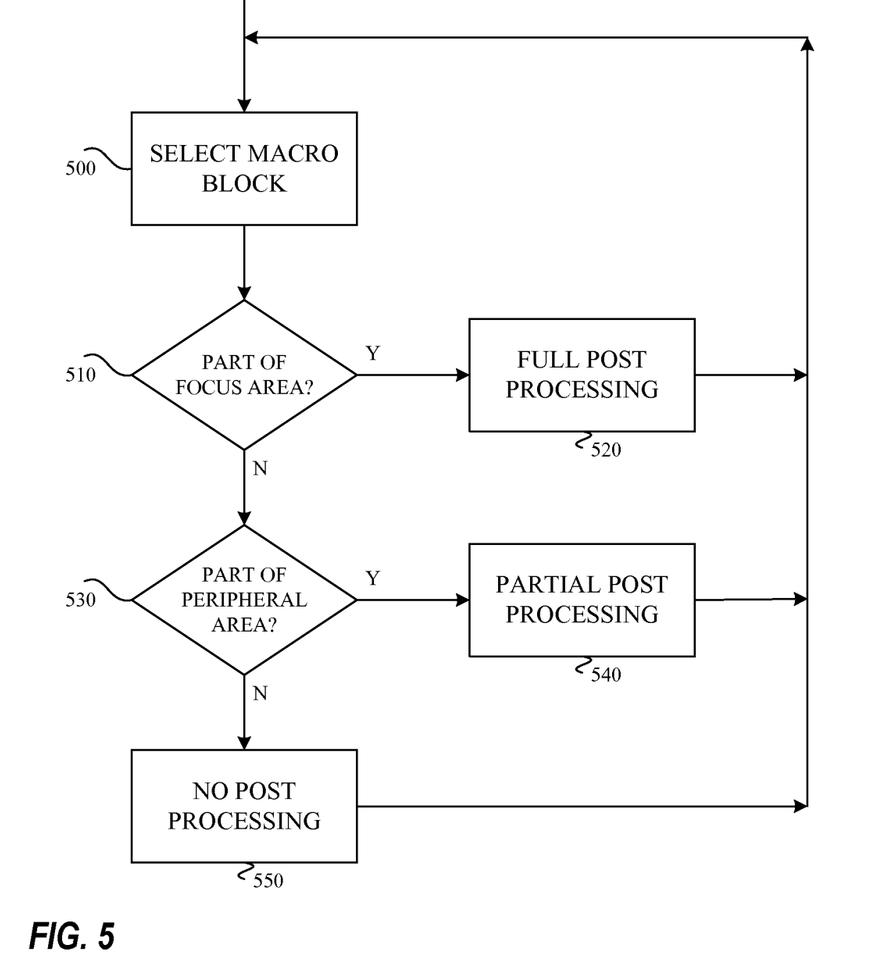
FIG. 5 illustrates an example flowchart of the selective image post processing, according to one embodiment.

FIG. 5 illustrates an example flowchart of the selective image post processing (e.g., 470 of FIG. 4). A macro block of pixels is selected 500. A determination is made as to whether the macro block of pixels being processed is within the focus area defined 510. If the determination is that the macro block is within the focus area (510 Yes), then full post processing is performed thereon 520. If the determination is that the macro block is not within the focus area (510 No), then a determination is made as to whether the macro block of pixels being processed is within the peripheral area defined 530. If the determination is that the macro block is within the peripheral area (530 Yes), then partial post processing is performed thereon 540. As described above, the partial post processing may be scaled based on distance from the focus area to create a transition between the focus area and the area outside the peripheral area. If the determination is that the macro block is not within the peripheral area (530 No), then no post processing is performed 550. The process continues for each macro block in the image.

The process of FIG. 5 is illustrated as being serial. However, as noted above with respect to FIG. 3 a plurality of processing engines may be utilized that operate in parallel and each processing engine may follow this process.

Figure 6:
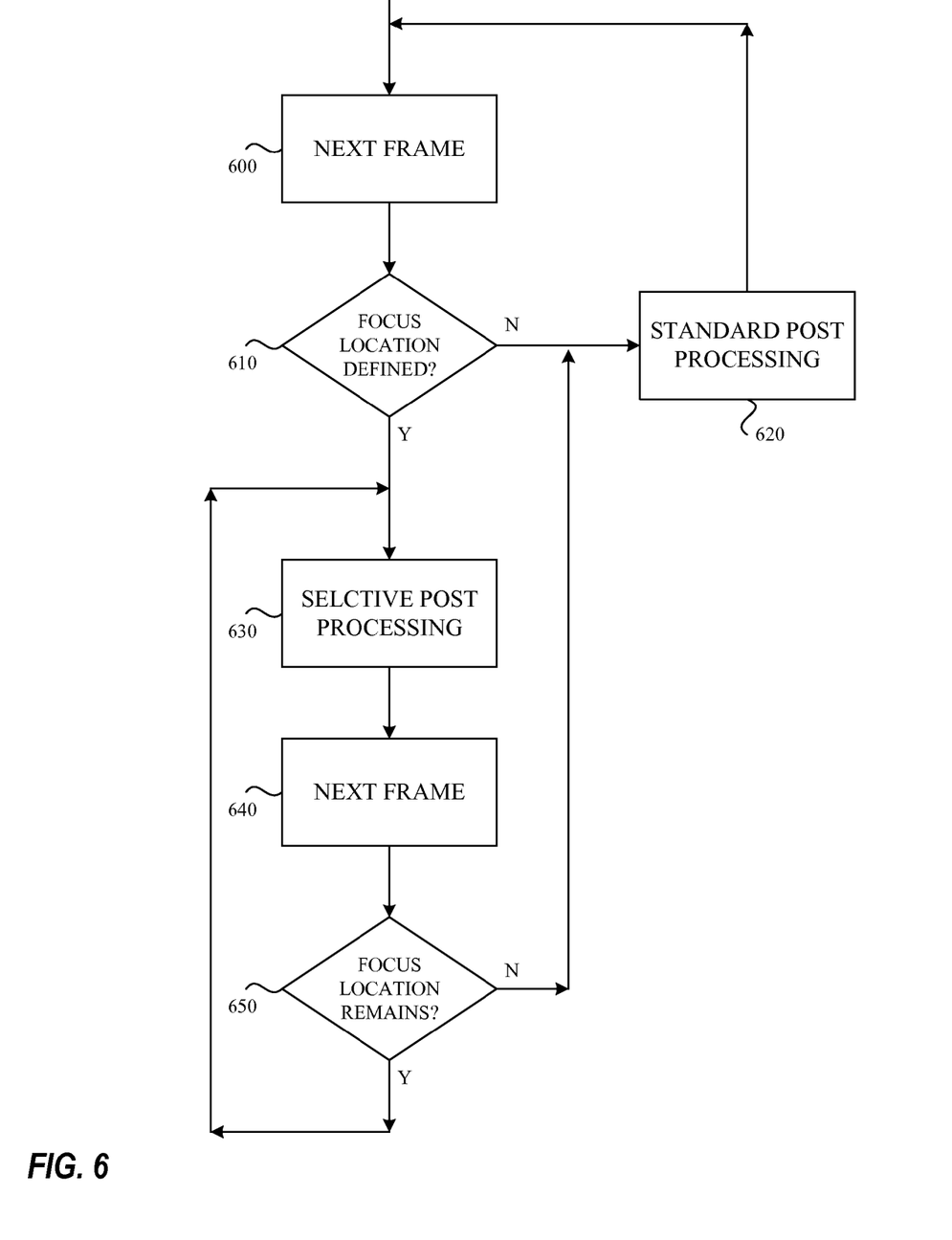
FIG. 6 illustrates an example flowchart for image post processing of frames within a video, according to one embodiment.

FIG. 6 illustrates an example flowchart for image post processing of frames within a video. A next frame is received 600 and a determination is made regarding whether a focus location has been defined 610. As previously discussed, a focus location may be defined based on a user's eyes being focused on the same general area of the video for at least a defined period of time. If the determination is that a focus location has yet to be determined (610 No), the frame has standard post processing performed on the pixels (macro blocks) making up the image 620. After the standard post processing on the frame 620 is complete the process starts again and a next frame is retrieved 600. If the determination is that a focus location has been determined (610 Yes), the frame has selective post processing performed on the pixels (macro blocks) making up the image 630. While not illustrated separately, the selective post processing 630 may include determining the focus area and a peripheral area (transition area), determining which macro blocks are within which area of the image, and determining the amount of post processing to be performed on each area.

Upon completion of the selective post processing on a frame 630, a next frame may be retrieved 640. A determination may then be made as to whether the focus location is still valid 650. The focus location may remain valid if the users eyes are still focused on the same general area of the video. The determination may require that the user remove their eyes from the focus for a least some period of time to avoid blinking or a quick look away from determining the focus area no longer is valid. The determination may track the movement of the user's focus to determine when the focus area is no longer valid (e.g., user focusing on another area, user scanning overall image). If the determination is that a focus location is no longer valid (650 No), the frame has standard post processing performed on the pixels 620. If the determination is that a focus location is still valid (650 Yes), the frame has selective post processing performed on the pixels 630.

Figure 7:
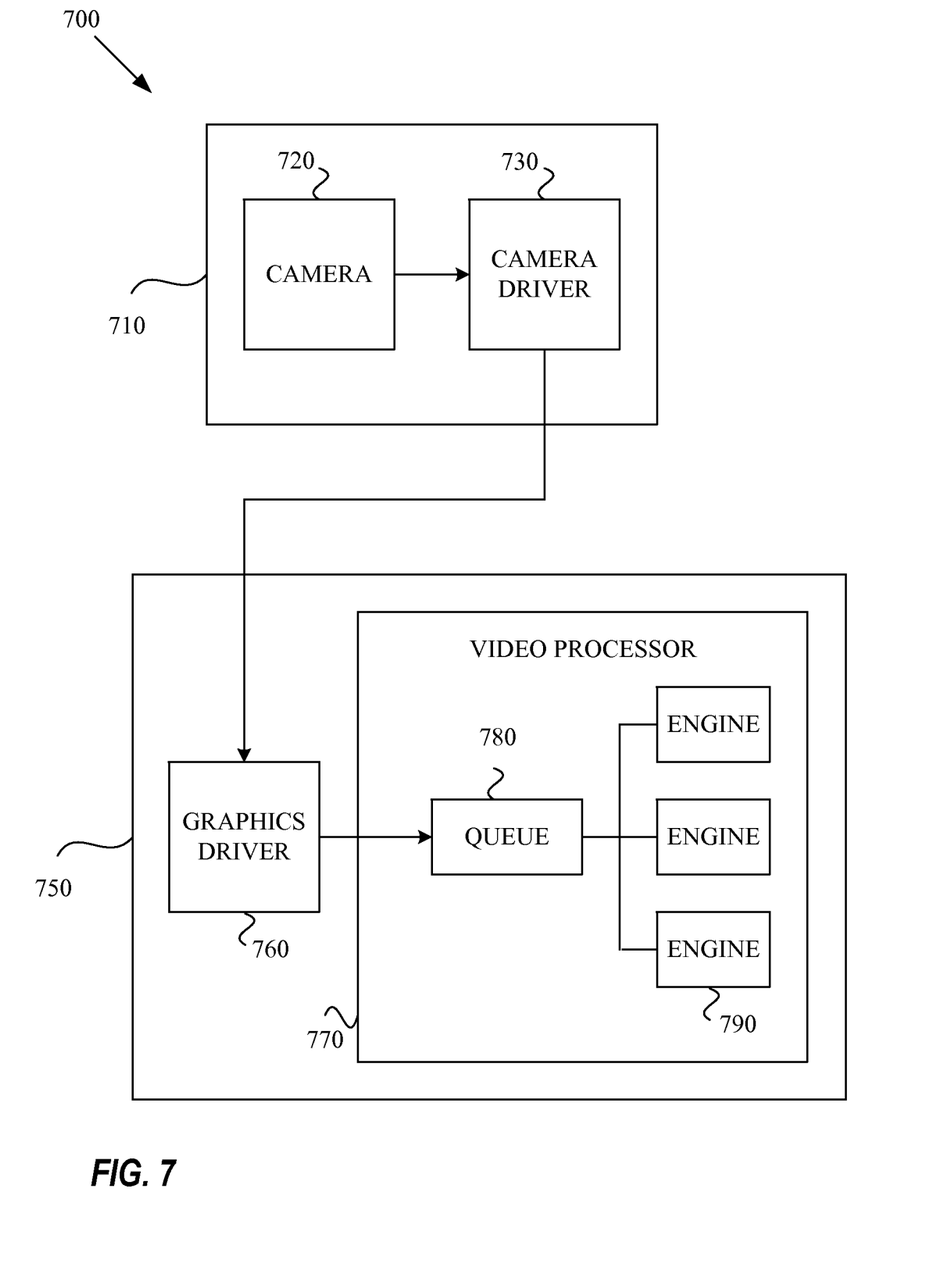
FIG. 7 illustrates an example system for performing selective post processing of video, according to one embodiment.

FIG. 7 illustrates an example system for performing selective post processing of video 700. The system 700 includes an intuitive user interface 710 and a graphics engine 750. The initiative user interface 710 may include one or more cameras 720 and a camera driver 730. The camera(s) 720 may capture images of the user of the system 700 and the driver 730 may analyze the image and detect certain attributes related to the user that can be used to interact with the system 700. The driver 730 may include determining coordinates for the eyes of the user and providing the coordinates to the graphics engine 750. The driver 730 may include instructions stored on a processor readable storage medium that when executed causes the processor to perform certain functions (e.g., analyze the captured images, detect a users eyes within the images and assign coordinates thereto).

The graphics engine 750 may include a graphics driver 760 and a video processor 770. The graphics driver 760 may receive the coordinates from the camera driver 730 and determine if the user is focusing on a particular area of the video. If it is determined that the user is focusing on a particular area the graphics driver 760 may define a focus area and a periphery (transition) area and identify the macro blocks that are within each area. The graphics driver 760 may also define the post processing to be performed on each macro block. The graphics driver 760 may provide instructions for processing the various macro blocks to the video processor 770. The driver 760 may include instructions stored on a processor readable storage medium that when executed causes the processor to perform certain functions (e.g., determine if a focus location exists and if it does determine focus area, periphery area, macro blocks in each area, and selective post processing parameters).

The video processor 770 may include a queue 780 and a plurality of processing engines 790 (three illustrated, but in no way intended to be limited thereby). The queue 780 may store the macro blocks awaiting processing therein. Each processing engine 790 may take a next macro block from the queue 780 and be capable of performing post processing on the macro block. The use of multiple processing engines 790 enables a plurality of macro blocks to be processed in parallel.

The post processing functionality and the determination of partial post processing described above in FIGS. 2-7 may be implemented, for example, in video processing portion of a CPU, in a GPU, in a discrete graphics integrated circuit, or some combination thereof. Furthermore, the operations may be implemented in hardware, software, firmware or some combination thereof. The CPU, GPU and/or discrete graphics integrated circuit may have access to device readable storage (on the device, off the device, or some combination thereof) that contains instructions that when executed by the device causes the device to perform at least a subset of the operations described above in FIGS. 4-6.

The various embodiments described above may be implemented in various systems that display content (content display systems) and the content display systems may be incorporated in various devices.

Figure 8:
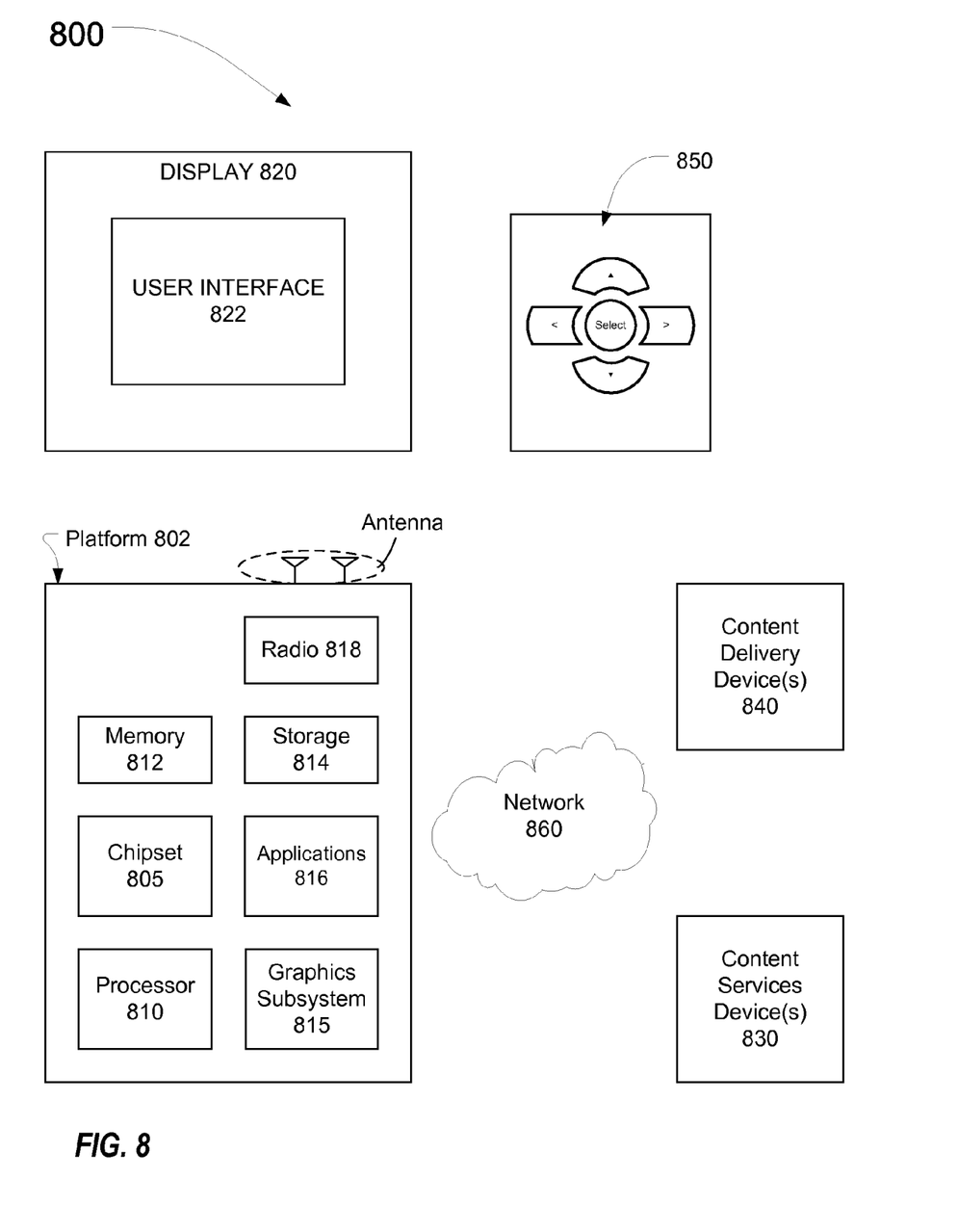
FIG. 8 illustrates an example content display system, according to one embodiment.

FIG. 8 illustrates an example content display system 800. The system 800 may be a media system although it is not limited to this context. The system 800 may be incorporated into, for example, a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 800 comprises a platform 802 coupled to an external display 820. The platform 802 may receive content from a content device such as content services device(s) 830, content delivery device(s) 840 or other similar content sources. A navigation controller 850 comprising one or more navigation features may be used to interact with, for example, the platform 902 and/or the display 820.

In embodiments, the platform 802 may comprise any combination of a chipset 805, a processor 810, memory 812, storage 814, a graphics subsystem 815, applications 816 and/or a radio 818. The chipset 805 may provide intercommunication among the processor 810, the memory 812, the storage 814, the graphics subsystem 815, the applications 816 and/or the radio 818. The chipset 805 may, for example, include a storage adapter (not depicted) capable of providing intercommunication with the storage 814.

The processor 810 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 810 may comprise dual-core processor(s), dual-core mobile processor(s), and so forth.

The memory 812 may be implemented as a volatile memory device such as, but not limited to, a Random Access Memory (RAM), Dynamic Random Access Memory (DRAM), or Static RAM (SRAM).

The storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, the storage 814 may comprise technology to increase the storage performance or enhanced protection for valuable digital media when multiple hard drives are included, for example.

The graphics subsystem 815 may perform processing of images such as still or video for display. The graphics subsystem 815 may be a graphics processing unit (GPU) or a visual processing unit (VPU), for example. An analog or digital interface may be used to communicatively couple the graphics subsystem 815 and the display 820. For example, the interface may be any of a High-Definition Multimedia Interface, DisplayPort, wireless HDMI, and/or wireless HD compliant techniques. The graphics subsystem 815 could be integrated into the processor 810 or the chipset 805. The graphics subsystem 815 could be a stand-alone card communicatively coupled to the chipset 805.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, the radio 818 may operate in accordance with one or more applicable standards in any version.

In embodiments, the display 820 may comprise any television type monitor or display. The display 820 may comprise, for example, a computer display screen, touch screen display, video monitor, television-like device, and/or a television. The display 820 may be digital and/or analog. In embodiments, the display 820 may be a holographic display. Also, the display 820 may be a transparent surface that may receive a visual projection. Such projections may convey various forms of information, images, and/or objects. For example, such projections may be a visual overlay for a mobile augmented reality (MAR) application. Under the control of one or more software applications 816, the platform 802 may display the user interface 822 on the display 820.

In embodiments, the content services device(s) 830 may be hosted by any national, international and/or independent service and thus accessible to the platform 802 via the Internet, for example. The content services device(s) 830 may be coupled to the platform 802 and/or to the display 820. The platform 802 and/or the content services device(s) 830 may be coupled to a network 860 to communicate (e.g., send and/or receive) media information to and from the network 860. The content delivery device(s) 840 also may be coupled to the platform 802 and/or to the display 820.

In embodiments, the content services device(s) 830 may comprise a cable television box, personal computer, network, telephone, Internet enabled devices or appliance capable of delivering digital information and/or content, and any other similar device capable of unidirectionally or bidirectionally communicating content between content providers and the platform 802 and/or the display 820, via the network 860 or directly. It will be appreciated that the content may be communicated unidirectionally and/or bidirectionally to and from any one of the components in the system 800 and a content provider via the network 860. Examples of content may include any media information including, for example, video, music, medical, gaming information, and so forth.

The content services device(s) 830 receives content such as cable television programming including media information, digital information, and/or other content. Examples of content providers may include any cable or satellite television or radio or Internet content providers. The provided examples are not meant to limit embodiments of the invention.

In embodiments, the platform 802 may receive control signals from navigation controller 850 having one or more navigation features. The navigation features of the controller 850 may be used to interact with the user interface 822, for example. In embodiments, the navigation controller 850 may be a pointing device that may be a computer hardware component (specifically human interface device) that allows a user to input spatial (e.g., continuous and multi-dimensional) data into a computer. Many systems such as graphical user interfaces (GUI), televisions and monitors allow the user to control and provide data to the computer or television using physical gestures.

Movements of the navigation features of the controller 850 may be echoed on a display (e.g., display 820) by movements of a pointer, cursor, focus ring, or other visual indicators displayed on the display. For example, under the control of software applications 816, the navigation features located on the navigation controller 850 may be mapped to virtual navigation features displayed on the user interface 822, for example. In embodiments, the controller 850 may not be a separate component but integrated into the platform 802 and/or the display 820. Embodiments, however, are not limited to the elements or in the context shown or described herein.

In embodiments, drivers (not shown) may comprise technology to enable users to instantly turn on and off the platform 802 like a television with the touch of a button after initial boot-up, when enabled, for example. Program logic may allow the platform 802 to stream content to media adaptors or other content services device(s) 830 or content delivery device(s) 840 when the platform is turned "off." In addition, the chipset 805 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 800 may be integrated. For example, the platform 802 and the content services device(s) 830 may be integrated, or the platform 802 and the content delivery device(s) 840 may be integrated, or the platform 802, the content services device(s) 830, and the content delivery device(s) 840 may be integrated, for example. In various embodiments, the platform 802 and the display 820 may be an integrated unit. In various embodiments, the display 820 and the content service device(s) 830 may be integrated, or the display 820 and the content delivery device(s) 840 may be integrated, for example. These examples are not meant to limit the invention.

In various embodiments, the system 800 may be implemented as a wireless system, a wired system, or a combination of both. When implemented as a wireless system, the system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, the system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
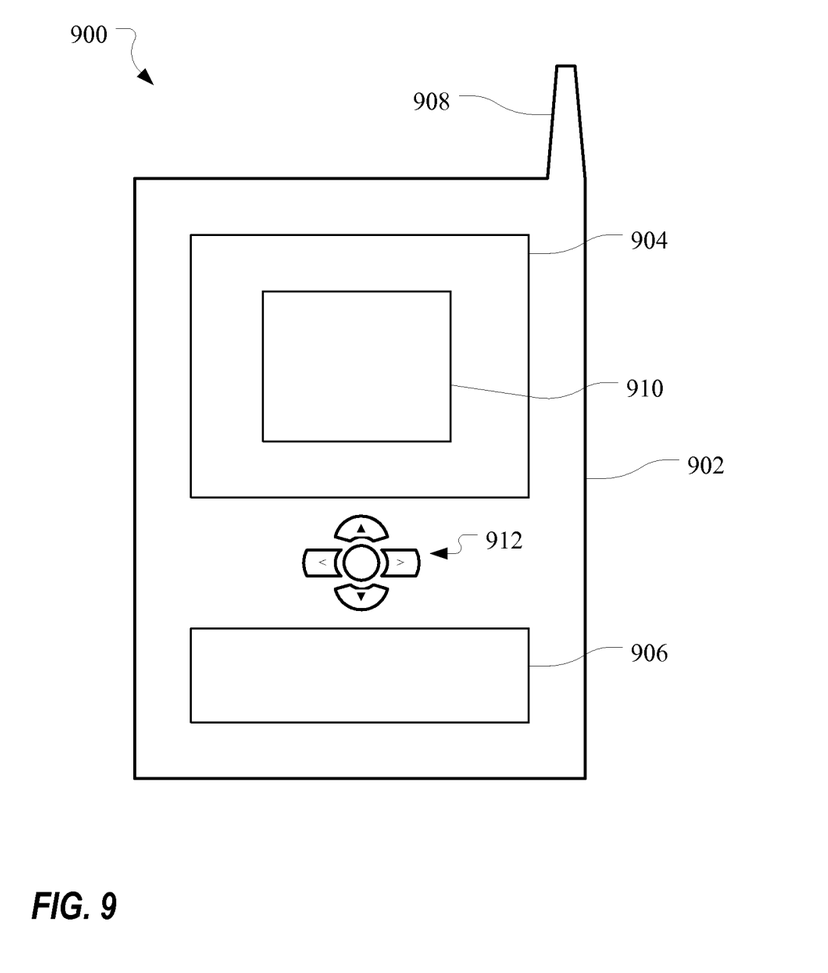
FIG. 9 illustrates an example small form factor device in which the system of FIG. 8 may be embodied, according to one embodiment.

As described above, the system 800 may be embodied in varying physical styles or form factors. FIG. 9 illustrates embodiments of a small form factor device 900 in which the system 800 may be embodied. In embodiments, for example, the device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example the mobile computing device may be utilized in a vehicle (e.g., car, truck, van). The in-vehicle device may provide information and/or entertainment to occupants of the vehicle (in-vehicle infotainment (IVI) device). The IVI device may utilize power from the vehicle as an external power source in addition to, or in place of, an internal battery powering the device.

In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The device 900 may comprise a housing 902, a display 904, an input/output (I/O) device 906, and an antenna 908. The device 900 also may comprise navigation features 912. The display 904 may comprise any suitable display unit for displaying information appropriate for a mobile computing device. The I/O device 906 may comprise any suitable I/O device for entering information into a mobile computing device. Examples for the I/O device 906 may include an alphanumeric keyboard, a numeric keypad, a touch pad, input keys, buttons, switches, rocker switches, microphones, speakers, voice recognition device and software, and so forth. Information also may be entered into the device 900 by way of microphone. Such information may be digitized by a voice recognition device. The embodiments are not limited in this context. The device 900 may include a battery (not illustrated) to provide power thereto. The battery may be located in the device 900 (e.g., within the housing 902) and/or may be remote from the device 900 (e.g., vehicle battery utilized for IVI device).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A method comprising:
performing post processing on pixels of decoded video frames;
presenting the post processed video frames as a video on a device;
receiving information associated with a user watching the video on the device;
determining, based on the information associated with the user, when the user is focusing their attention on a particular portion of the video being presented;
determining a focus area associated with the particular portion of the video the user is focusing their attention on;
determining a peripheral area around the focus area; and
modifying the performing of the post processing based on the focus area, wherein the modifying includes reducing post processing performed on pixels of the decoded video frames that are within the peripheral area a first amount and reducing post processing performed on pixels of the decoded video frames that are external to the focus area and the peripheral area a second amount.

2. The method of claim 1, wherein the receiving includes receiving information related to where eyes of the user are focused.

3. The method of claim 2, wherein the information related to where eyes are focused include coordinates for location of where the eyes are focused.

4. The method of claim 2, wherein the determining when the user is focusing their attention includes determining when the eyes of the user have been focusing on the particular portion of the video for at least a defined time frame.

5. The method of claim 1, wherein the reducing post processing performed on pixels of the decoded video frames that are external to the focus area and the peripheral area includes eliminating the post processing performed.

6. The method of claim 1, wherein the reducing post processing on pixels of the decoded video frames in the peripheral area includes gradually reducing the post processing as distance from the focal area increases.

7. The method of claim 1, further comprising determining macro blocks of pixels within the focus area, within the peripheral area, and not within either area.

8. The method of claim 1, further comprising
determining macro blocks of pixels of the decoded video frames within the focus area, within the peripheral area, and not within either area, wherein the modifying further includes:
performing a first level of post processing on the macro blocks within the focus area;
performing a second level of post processing on the macro blocks within the peripheral area; and
performing a third level of post processing on the macro blocks not within either area.

9. A graphics engine comprising
a graphics driver to
receive information related to where eyes of a user watching a video are focused;
determine, based on the information related to the user's eyes, when the user is focusing their attention on a particular portion of the video;
determine a focus area associated with the particular portion of the video the user is focusing their attention on
determine a peripheral area around the focus area and
generate post processing instructions to identify post processing to be performed on pixel macro blocks of decoded video frames, wherein the post processing instructions are modified, when the focus area and peripheral area are determined, to
reduce post processing performed on the pixel macro blocks that are within the peripheral area a first amount; and
reduce post processing performed on pixel macro blocks that are external to the focus area and the peripheral area a second amount; and
a video processor to perform the post processing on the pixel macro blocks pursuant to the post processing instructions.

10. The graphics driver of claim 9, wherein the graphics driver is to determine when the user is focusing on a particular location by determining if the eyes of the user have been focusing on the particular location of the video for at least a defined time frame.

11. The graphics driver of claim 9, wherein the graphics driver is to further to:
modify the post processing instructions to include:
a first level of post processing to be performed on the pixel macro blocks within the focus area;
a second level of post processing to be performed on the pixel macro blocks within the peripheral area; and
a third level of post processing to be performed on the pixel macro blocks not within either area.

12. The graphics driver of claim 11, wherein the second level of post processing includes less post processing than the first level of post processing and the third level of post processing includes less post processing than the second level of post processing.

13. The graphics driver of claim 11, wherein the second level of post processing includes a gradual reduction in post processing performed based on distance from the focus area.

14. The graphics driver of claim 11, wherein the third level of post processing includes no post processing being performed.

15. A non-transitory processor readable storage medium storing instructions, wherein when the instructions are executed by a processor they cause the processor to:

receive information related to where eyes of a user watching a video are focused;
determine, based on the information related to the user's eyes, when the user is focusing their attention on a particular portion of the video;
determine a focus area associated with the particular portion of the video the user is focusing their attention on;
determine a peripheral area around the focus area; and
generate post processing instructions to identify post processing to be performed on pixel macro blocks of decoded video frames, wherein the post processing instructions are modified, when the focus area and peripheral area are determined, to reduce post processing for
   pixel macro blocks within the peripheral area a first amount, and
   pixel macro blocks outside the focus area and the peripheral area a second amount.

16. The non-transitory processor readable storage medium of claim 15, wherein the instructions when executed further cause the processor to:
modify the post processing instructions to include;
   a first level of post processing to be performed on the pixel macro blocks within the focus area;
   a second level of post processing to be performed on the pixel macro blocks within the peripheral area, wherein the second level of post processing includes less post processing than the first level of post processing; and
   a third level of post processing to be performed on the pixel macro blocks not within either area, wherein the third level of post processing includes less post processing than the second level of post processing.

17. The non-transitory processor readable storage medium of claim 15, wherein the instructions when executed further cause the processor to:
modify the post processing instructions to include;
   a first level of post processing to be performed on the pixel macro blocks within the focus area;
   a second level of post processing to be performed on the pixel macro blocks within the peripheral area, wherein the second level of post processing gradually reduces post processing performed based on distance from the focus area; and
   eliminate post processing for pixel macro blocks not within either area.

18. A system comprising
an intuitive user interface to track user eye movements while a user is viewing a video; and
a graphics engine to
   determine when if the user is focusing their attention on a particular portion of the video based on input from the institutive user interface;
   determine a focus area associated with the particular portion of the video the user is focusing their attention on;
   determine a peripheral area around the focus area;
   generate post processing instructions to identify post processing to be performed on pixel macro blocks of decoded video frames, wherein the post processing instructions are modified, when the focus area and peripheral area are determined, to reduce post processing for
      pixel macro blocks within the peripheral area a first amount, and
      pixel macro blocks outside the focus area and the peripheral area a second amount; and
   post process the pixel macro blocks of the decoded video frames in accordance with the post processing instructions.

19. The system of claim 18, wherein the graphics engine includes a graphics driver and a video processor.

20. The system of claim 18, wherein the graphics engine is further to:
modify the post processing instructions to include:
   a first level of post processing to be performed on the pixel macro blocks within the focus area;
   a second level of post processing to be performed on the pixel macro blocks within the peripheral area, wherein the second level of post processing includes less post processing than the first level of post processing; and
   a third level of post processing to be performed on the pixel macro blocks not within either area, wherein the third level of post processing includes less post processing than the second level of post processing.

21. The system of claim 18, wherein the graphics engine is further to:
modify the post processing instructions to include:
   a first level of post processing to be performed on the pixel macro blocks within the focus area;
   a second level of post processing to be performed on the pixel macro blocks within the peripheral area, wherein the second level of post processing gradually reduces post processing performed based on distance from the focus area; and
   eliminate post processing for pixel macro blocks not within either area.

* * * * *